(12) United States Patent
Fruehauf

(10) Patent No.: US 6,714,764 B1
(45) Date of Patent: Mar. 30, 2004

(54) ERROR DETECTION CIRCUITRY AND METHOD FOR DETECTING AN ERROR ON A TRANSMISSION PATH

(75) Inventor: Dietmar Fruehauf, Loerrach (DE)

(73) Assignee: Motorola, Inc., Schaumburg, IL (US)

( * ) Notice: Subject to any disclaimer, the term of this patent is extended or adjusted under 35 U.S.C. 154(b) by 531 days.

(21) Appl. No.: 09/715,662

(22) Filed: Nov. 17, 2000

(51) Int. Cl.$^7$ ............................................. H04B 17/00
(52) U.S. Cl. ................................ 455/67.13; 455/114.2; 455/501; 455/423
(58) Field of Search ........................... 455/67.13, 63.1, 455/423, 424, 425, 466, 504, 501, 67.14, 114.2, 226.1, 226.2, 296; 370/249, 286, 292, 350

(56) References Cited

U.S. PATENT DOCUMENTS

| | | | |
|---|---|---|---|
| 4,137,499 A | * 1/1979 | Caudel | 455/115.3 |
| 4,977,616 A | * 12/1990 | Linder et al. | 455/277.2 |
| 5,287,555 A | 2/1994 | Wilson et al. | 455/115.1 |
| 5,784,406 A | * 7/1998 | DeJaco et al. | 375/224 |
| 5,898,928 A | * 4/1999 | Karlsson et al. | 455/450 |
| 5,966,378 A | * 10/1999 | Hamalainen | 370/348 |
| 6,035,183 A | * 3/2000 | Todd et al. | 455/226.2 |
| 6,137,441 A | * 10/2000 | Dai et al. | 342/357.16 |
| 6,167,259 A | * 12/2000 | Shah | 455/424 |
| 6,266,527 B1 | * 7/2001 | Mintz | 455/423 |

FOREIGN PATENT DOCUMENTS

EP    0 481 524 B1    1/1997

* cited by examiner

Primary Examiner—Vivian Chin
Assistant Examiner—Charles Craver
(74) Attorney, Agent, or Firm—Terri S. Hughes; Valerie M. Davis

(57) ABSTRACT

An error detection circuitry for detecting an error on a transmission path between a radio system (10, 12) and a transmitter is disclosed. The circuitry comprises means (16) for measuring the magnitude of a forward radio frequency signal directed from the radio system to the transmitter; means (16) for measuring the magnitude of a backward radio frequency signal directed from the transmitter to the radio system; and means for comparing the magnitudes of the forward radio frequency signal and the backward radio frequency signal. In a preferred embodiment of the invention a self-synchronization is provided for synchronizing a sampling of the output voltages of detecting circuits (24, 26) relative to the occurrence of a signal on the transmission path.

16 Claims, 3 Drawing Sheets

ERROR DETECTION CIRCUITRY AND METHOD FOR DETECTING AN ERROR ON A TRANSMISSION PATH

FIELD OF THE INVENTION

The present invention generally relates to radio frequency circuitries that are implemented in radio devices, e.g. cellular telephones, and more particularly to an error detection circuitry for detecting an error on a transmission path between a radio system and a transmitter. The present invention is further related to a method for detecting an error on a transmission path between a radio system and a transmitter.

BACKGROUND OF THE INVENTION

In special types of radio devices, the transmitting system is not directly attached to the radio device. For example, in mobile stations implemented in a railway train, a radio frequency (RF) cable provides a connection between the radio itself (located inside the driver cabin) and the antenna (located outside). It is desirable to check the quality of the RF connection and to detect a damaged, missing or obstructed antenna, e.g. during system start-up or at any desired time. A monitoring of the RF connection might be necessary due to safety purposes.

U.S. Pat. No. 5,287,555 discloses a method for checking a RF connection and an antenna. A directional coupler is provided as a part of the transmitter circuitry in order to determine the power that is reflected from the transmitting system. It is determined, whether such "reverse" power is within a normal range. A reverse power within the normal range indicates a proper performance of the transmitting system.

However, if there is no access to internal signals of the transmitter system available, e.g. in the case that the transmitter system belongs to a third party supplier and the antenna is not directly attached to the radio, the above mentioned method has a drawback. If there is no access to the transmitter system, the decision between normal operation and an error case only on the basis of the amplitude of a reflected signal is not sufficient. The reason for this is that in real systems a certain RF power reflection always occurs; thus, in the case that the transmitter system operates in a wide range of output power, it is very difficult or even impossible to define an appropriate reference level in order to distinguish between normal operation and an error.

A further problem that is related to the separation between the radio and the transmitter system occurs in digital systems that operate in a TDMA mode ("Time Divisional Multiple Access"). Since the RF signals in a TDMA radio communication system are intermittent, a sampling of the signals must take place at an appropriate time. Thus, a timing is required that synchronizes the sampling and the occurrence of the reverse signal. In systems with access to the transmitter system a general timing signal may be used in order to define the timeslots and further for timing of the sampling. Such timing signal can advantageously be provided by a microprocessor. However, in a system without access to the transmitter system, there is also no access to a separate timer of the transmitter system. Thus, a general timing signal for the transmitter system and for the radio is not available.

Due to the possible separation between the transceiver system and the radio there are more difficulties related to the sampling of TDMA signals. In particular, a further problem arises with the introduction of the GPRS ("General Packet Radio Services") protocol since the GPRS protocol is not restricted to use a single timeslot within a frame, but more than one timeslot may be occupied depending on the communication requirements.

These and other problems related to the prior art systems will be discussed further below with reference to the accompanying drawings.

The present invention seeks to solve the above mentioned problems and to provide an error detection circuitry and a method for detecting an error that are applicable to a system in which a transmitting system is not directly attached to a radio.

DETAILED DESCRIPTION OF A PREFERRED EMBODIMENT

According to the invention an error detection circuitry for detecting an error on a transmission path between a radio system and a transmitter is provided, comprising means for measuring the magnitude of a forward radio frequency signal directed from the radio system to the transmitter, means for measuring the magnitude of a backward radio frequency signal directed from the transmitter to the radio system, and means for comparing the magnitudes of the forward radio frequency signal and the backward radio frequency signal.

According to the invention there is further provided a method for detecting an error on a transmission path between a radio system and a transmitter comprising the steps of measuring the magnitude of a forward radio frequency signal directed from the radio system to the transmitter, measuring the magnitude of a backward radio frequency signal directed from the transmitter to the radio system, and comparing the magnitudes of the forward radio frequency signal and the backward radio frequency signal.

Due to the comparison of the forward power and the backward power the need of an access to the transmitter system is eliminated, since no absolute trigger value is necessary. The comparison between both voltages delivers fundamental information about the quality of the RF connection.

Figure 1:
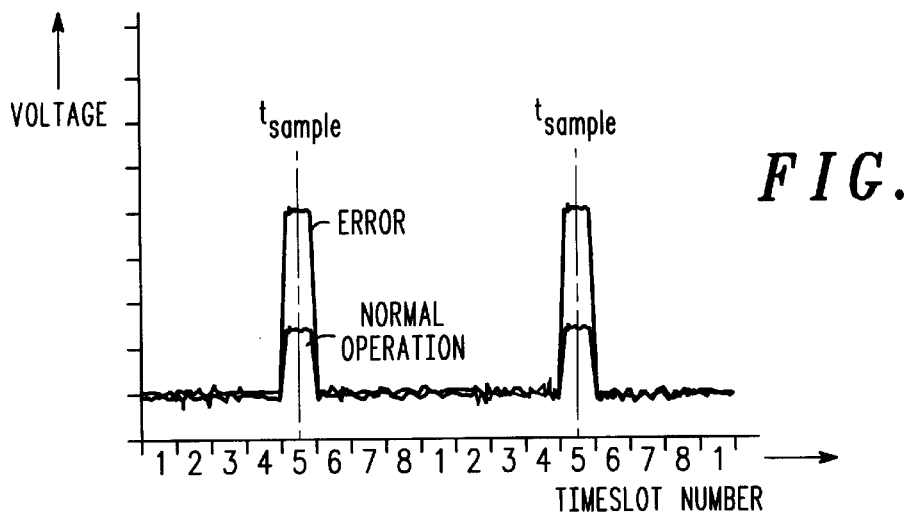
FIG. 1 shows a diagram illustrating a directional coupler backward output voltage.

FIG. 1 shows a diagram that generally illustrates a directional coupler backward output voltage. The voltage is plotted versus the timeslot number of a GSM system. During normal operation of the system a signal with a small voltage amplitude is reflected. Thus, the directional coupler backward output voltage is small during normal operation. However, when an error occurs in the RF connection, the reflected signal is larger in amplitude. Thus, the directional coupler backward output voltage has a larger amplitude in case of an error. Prior art systems in which the desired amplitude during normal operation is known, as for example the system that is described in U.S. Pat. No. 5,287,555, are able to recognize an error by sampling the directional coupler backward output voltage at a time $t_{sample}$ and by comparing the sampled value to a desired value that corresponds to normal operation. However, if there is no access to internal signals of the transmitter system available, also the desired value is not known. Therefore, the prior art systems do not work, if e.g. in mobile stations the transmitter system belongs to a third party supplier and the antenna is not directly attached to the radio as in the mentioned railway applications.

Figure 2:
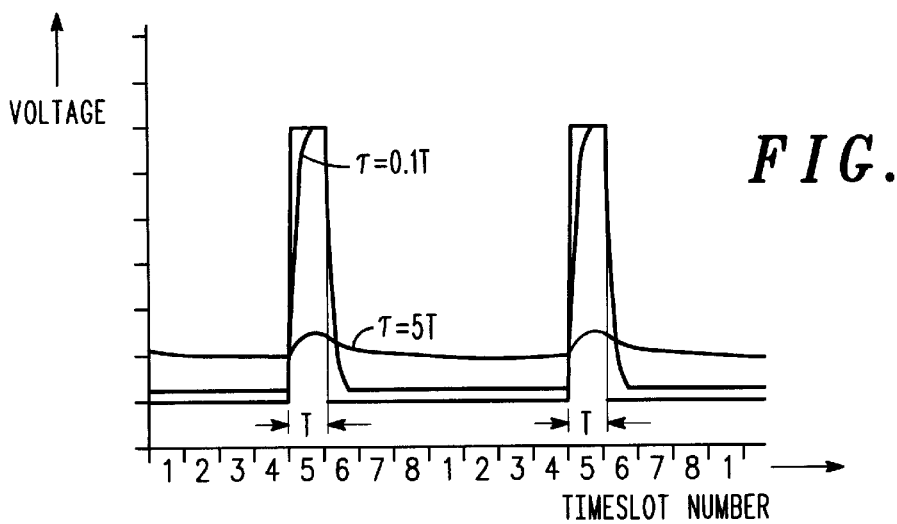
FIG. 2 shows a diagram illustrating a detecting circuit output voltage.

FIG. 2 shows a diagram generally illustrating a detecting circuit output voltage which is plotted versus the timeslot number of a GSM system. The ideal directional coupler output is indicated as a square signal. RF detecting circuits normally contain a smoothing circuitry with a certain time constant. In the diagram two output curves for different time constants ($\Omega=0.1T$ and $\Omega=5T$) are shown, wherein T is the duration of a timeslot. An appropriate time constant has to be chosen. A low time constant is able to properly represent the ideal directional coupler output; however, the remaining ripples are too high. On the other hand, when the time constant is too high, thereby avoiding ripples, the resulting direct current (DC) is very low due to the low duty cycle of TDMA radio communication systems (e.g. 1:8 in GSM systems); such a low DC causes problems in the presence of noise.

Figure 3:
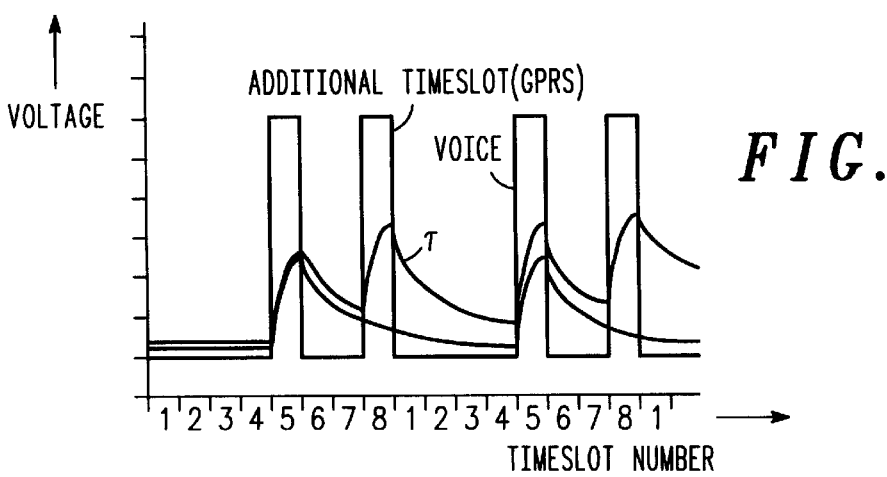
FIG. 3 shows a diagram illustrating a detecting circuit output voltage.

FIG. 3 also shows a detecting circuit output voltage versus the timeslot number. In this case, a detecting circuit output voltage for a GPRS protocol ("General Packet Radio Services") is shown. GPRS protocols do not only use a single timeslot within a frame, but two and more timeslots are in use depending on the communication requirements. Only one sampling may take place within one transmission frame, because otherwise the lowpass filter output is influenced by previous sampling periods. Thus, it is important to have only one sampling during one frame and to adapt the time constant of the lowpass filter properly.

Figure 4:
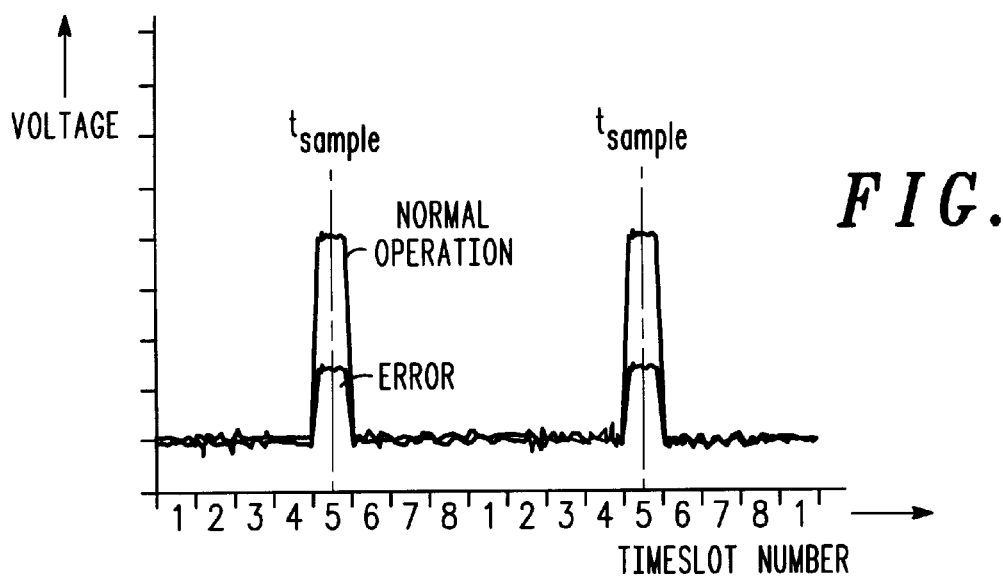
FIG. 4 shows a diagram illustrating a directional coupler forward output voltage.

For illustration of the invention, FIG. 4 shows a directional coupler forward output voltage, and FIG. 1 (mentioned above) shows a directional coupler backward output voltage, both versus the timeslot number of a GSM system. Due to the provision of a directional coupler that outputs a forward output voltage it is no longer necessary to know the level that is indicated in FIG. 1 by normal operation. The ratio between the forward output voltage and the backward output voltage may be used to determine the quality of the RF connection.

Figure 5:
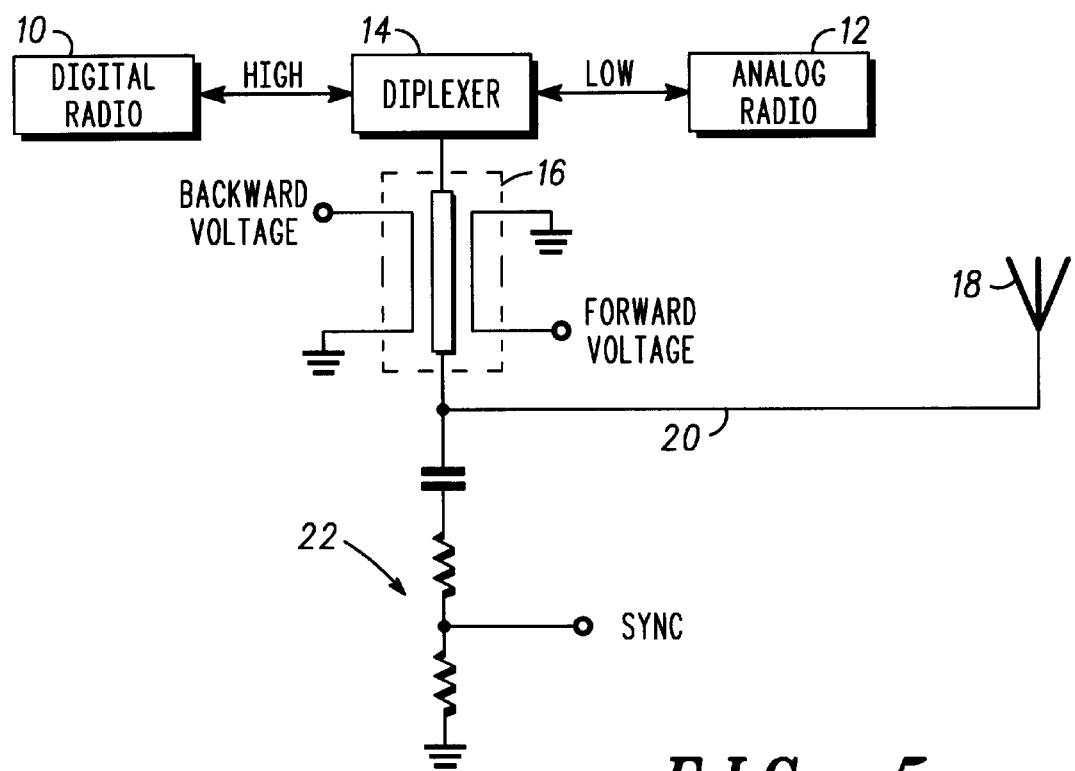
FIG. 5 shows a block diagram of a RF part of a radio system, according to the invention.

FIG. 5 shows a block diagram of a RF part of a radio system, according to the invention. A digital radio 10 which is optionally a GSM/GPRS radio and an analogue radio 12 are coupled to a diplexer 14. The diplexer 14 is connected to a directional coupler 16 that provides a forward voltage (FORWARD) and a backward voltage (BACKWARD). The system is coupled to an antenna 18 via a RF transmission path 20. In such a system the problem occurs that no general timing signal for a sampling of the backward voltage and of the forward voltage is available, since the radio system has no access to the transmitter system; thus, the timing signal of the transmitter system can not be used as a trigger for sampling. This problem is solved by the additional provision of a voltage divider 22 that has a high resistance and that produces only a negligible load for the RF system. Due to the negligible load the high resistance voltage divider 22 does not influence the impedance of the RF path. The voltage divider 22 provides a signal SYNC (preferably, a voltage) which is a fraction of the RF output signal. This signal SYNC may be used for self-synchronization purposes. Additionally, it is noted that the SYNC signal is not sensitive to the ratio between the backward voltage and the forward voltage.

Figure 6:
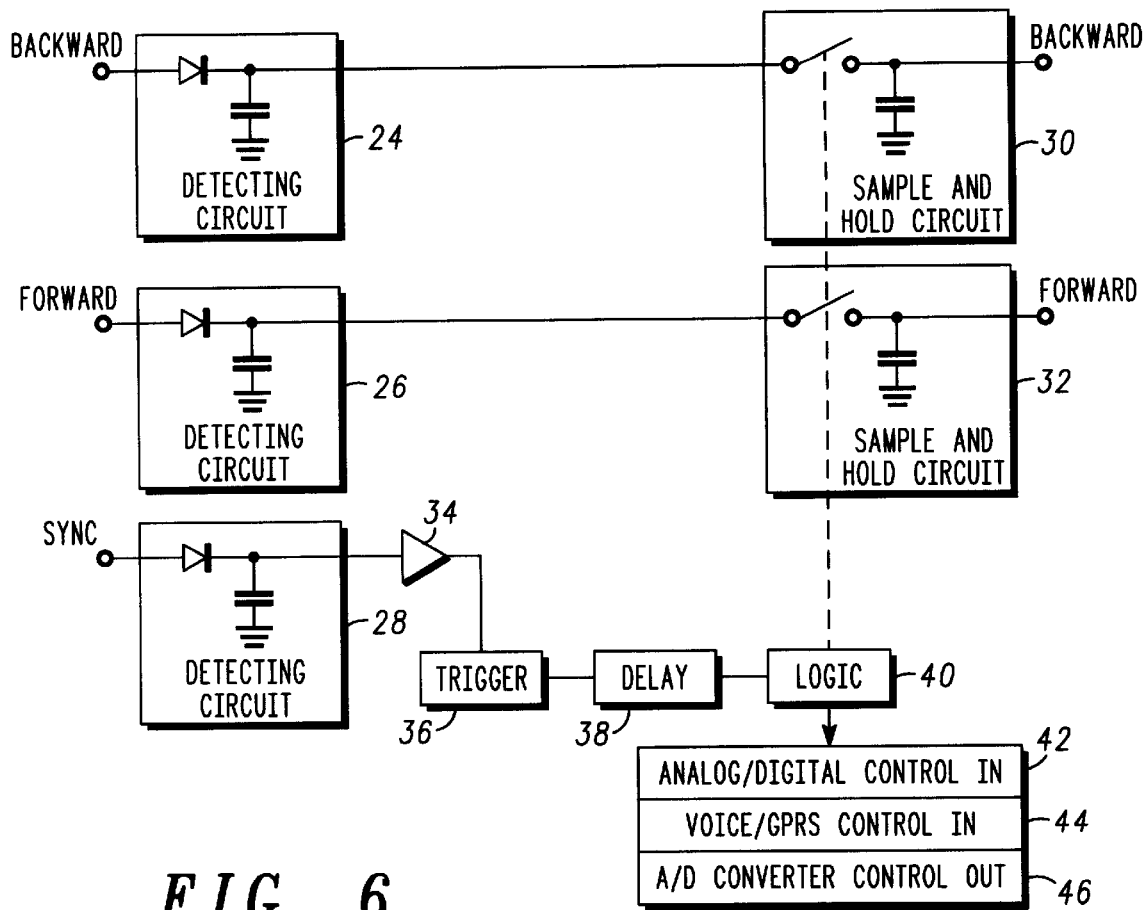
FIG. 6 shows a block diagram of a RF/DC part of a radio system, according to the invention.

In FIG. 6 the RF/DC part of the sampling circuitry is illustrated in order to explain the self-synchronization of the system that may be advantageously applied with the invention. In the detecting circuits 24, 26, 28 the three voltages BACKWARD, FORWARD and SYNC are demodulated, smoothed with a low time constant and buffered. The processed BACKWARD signal and the processed FORWARD signal are given to a sample and hold circuit 30 and to a sample and hold circuit 32, respectively. The detecting circuit 28 outputs a signal to an amplifier 34. The output of the amplifier 34 is given to a trigger circuit 36. The output of the trigger circuit is connected to an input of a delay circuit 38. Thus, the delayed trigger signal may be used to trigger the sample and hold circuit 30 and the sample and hold circuit 32. The triggering is managed by a logic unit 40. The logic unit 40 is provided with at least two inputs and one output. An analogue/digital control input 42 switches the synchronization logic off, when the analogue radio provides the RF output. The voice/GPRS control input 44 disables the sample function for a certain time depending on the duration of the digital radio transmission frame. Thereby a multiple triggering within one transmission frame, e.g. in a GPRS system, is avoided. The A/D control output 46 provides a signal in order to control an A/D converter for backward and forward voltage conversion.

Figure 7:
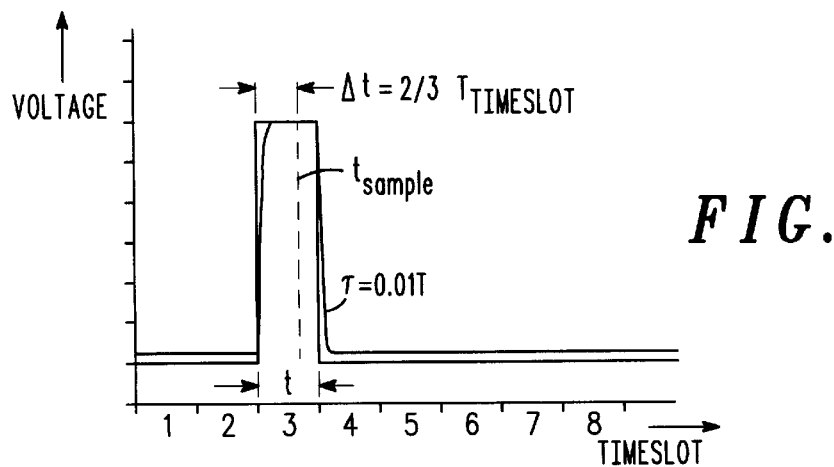
FIG. 7 shows a diagram illustrating a delayed sampling with low time constant, according to the invention.

The diagram of FIG. 7 illustrates a delayed sampling with low time constant that may be advantageously applied with the invention. An output voltage of the directional coupler 16 is plotted against the timeslot number of a TDMA system. Due to the low time constant the outputs of the detecting circuits 24, 26 rise quickly to the maximum voltage level. By sampling the signal near the end of the timeslot, a proper value can thus be obtained. In the example according to FIG. 7, the delay of the delay circuit 38 is chosen to be $\partial t = \frac{2}{3} T_{timeslot}$, wherein $T_{timeslot}$ is the length of a timeslot.

Having described the invention with details above, the invention is now summarized as follows. An error detection circuitry (cf. FIG. 5, divider 22, coupler 16, and the elements in FIG. 6) for detecting an error on a transmission path (cf. FIG. 5, path 20) between a radio system (10, 12) and a transmitter (cf. FIG. 5, represented by antenna 18) comprises: means (e.g., detecting circuit 26, S/H circuit 32) for measuring the magnitude of a forward radio frequency signal (FORWARD) directed from the radio system to the transmitter; means (e.g., detecting circuit 24, S/H circuit 30) for measuring the magnitude of a backward radio frequency signal (BACKWARD) directed from the transmitter to the radio system; and means for comparing (cf. FIG. 5 divider 22, FIG. 6 elements 28, 34, 36, 38, 40, 42, 44, 46) the magnitudes of the forward radio frequency signal and the backward radio frequency signal.

Preferably, the means for measuring the magnitude of the forward radio frequency signal has a directional coupler (cf. coupler 16) to provide a forward voltage; the means for measuring the magnitude of a backward radio frequency signal comprises that the directional coupler provides a backward voltage; the means for comparing calculates a ratio between the backward voltage and the forward voltage and decides that an error is present, when the ratio between the backward and the forward voltages (BACKWARD / FORWARD) exceeds a predetermined value.

Preferably, the radio system comprises analogue radio 12 and digital radio 10.

Preferably, the radio system comprises analogue radio 12 and TDMA radio communication system 10 which operates in a burst transmit mode, i.e., that transmits information signals in time slots.

Preferably, the means for measuring the magnitude of the forward radio frequency signal (FORWARD) has sample and hold circuitry 32 for measuring the magnitude of the forward radio frequency signal; the means for measuring the magnitude of the backward radio frequency signal (BACKWARD) has sample and hold circuitry 30 for measuring the magnitude of the backward radio frequency signal; and a means for simultaneously triggering the first and the second sample and hold circuitries is provided, as illustrated, for example by divider 22, detecting circuit 28, amplifier 34, trigger circuit 36, and delay circuit 38.

Preferably, means 22, 28, 34, 36, 38 generates a trigger signal on the basis of the occurrence of a TDMA signal on the transmission path, thereby providing an internal synchronization (e.g., SYNC signal).

Preferably, means 22, 28, 34, 36, 38 for generating a trigger signal has: voltage divider 22 to generate a voltage drop signal (SYNC, the mentioned fraction of the RF output signal) on the basis of the occurrence of a TDMA signal on the transmission path; detecting circuit 28 for demodulating, smoothing and buffering the voltage drop signal (SYNC); amplifier 34 for amplifying the demodulated, smoothed and buffered signal; trigger circuit 36 for processing the amplified signal; and delay circuit 38 for delaying the processed signal.

Means 22, 28, 34, 36, 38 for generating a trigger signal is coupled to logic unit 40; the logic unit 40 has analogue/digital control input 42 for switching an internal synchronization on and off.

Optionally, logic unit 40 has a voice/GPRS input 44 for disabling and enabling the sampling function. Optionally, logic unit 40 has analogue/digital control output 46 for controlling an analogue/digital conversion of a measured radio frequency signal.

A method for detecting an error on a transmission path between a radio system (10, 12) and a transmitter comprises the following steps: (i) measuring the magnitude of a forward radio frequency signal (FORWARD) directed from the radio system 10/12 to the transmitter (cf. antenna 18); (ii) measuring the magnitude of a backward radio frequency signal (BACKWARD) directed from the transmitter to radio system 10/12; and (iii) comparing the magnitudes of the forward radio frequency signal and the backward radio frequency signal, for example by control unit 42 receiving the representations of the FORWARD and BACKWARD signals from S/H units 32 and 30, respectively.

Preferably, in the first measuring step (i), the magnitude of the forward radio frequency signal is measured by using directional coupler 16 that provides a forward voltage (i.e. FORWARD); in the second measuring step (ii), the magnitude of the backward radio frequency signal is measured by using the directional coupler that provides a backward voltage (i.e., BACKWARD); further applied is (cf. step (iii)) calculating a ratio between the backward voltage and the forward voltage (e.g., by control unit 42); and deciding that an error is present, if the ratio between the backward and the forward voltages exceeds a predetermined value (e.g., also by control unit 42).

Preferably, the magnitude of the forward radio frequency signal is measured in sample and hold circuitry 32; the magnitude of the backward radio frequency signal is measured in sample and hold circuitry 30; and first and the second sample and hold circuitries 30, 32 are triggered simultaneously.

Preferably, the trigger signal is generated on the basis of the occurrence of a TDMA signal on the transmission path, and thereby providing an internal synchronization (cf. SYNC going through detecting circuit 28 and amplifier 34).

Preferred is also to generate the trigger signal by generating the voltage drop signal by voltage divider 22 on the basis of the occurrence of a TDMA signal on a transmission path; to demodulate, to smooth and to buffer the voltage drop signal; to amplify the demodulated, smoothed and buffered signal; to process the amplified signal in trigger circuit 36; and to delay the processed signal.

Optional is further to switch the internal synchronization on, when radio system 10/12 operates in digital mode; and to switching the internal synchronization off, when radio system 10, 12 operates in analogue mode.

Optional is further to selectively disable and enable the sampling function depending on the duration of a digital radio transmission frame. Preferably, controlling an analogue/digital conversion of a measured radio frequency signal is performed a logic unit 40.

While the invention has been described in terms of particular structures, devices and methods, those of skill in the art will understand based on the description herein that it is not limited merely to such examples and that the full scope of the invention is properly determined by the claims that follow.

What is claimed is:

1. An error detection circuitry for detecting an error on a transmission path between a radio system and a transmitter, the circuitry comprising:

means for measuring the magnitude of a forward radio frequency signal directed from the radio system to the transmitter;

means for measuring the magnitude of a backward radio frequency signal directed from the transmitter to the radio system; and means for comparing the magnitudes of the forward radio frequency signal and the backward radio frequency signal, wherein the means for measuring the magnitude of the forward radio frequency signal has a directional coupler providing a forward voltage; the means for measuring the magnitude of the backward radio frequency signal comprises the directional coupler providing a backward voltage; wherein the means for comparing calculate a ratio between the backward voltage and the forward voltage and decide that an error is present, when the ratio between the backward and the forward voltages exceeds a predetermined value.

2. The error detection circuitry according to claim 1 wherein the radio system comprises an analogue radio and a digital radio.

3. The error detection circuitry according to claim 1 wherein the radio system comprises an analogue radio, and a TDMA radio communication system operating in a burst transmit mode.

4. The error detection circuitry according to claim 1, wherein the means for measuring the magnitude of the forward radio frequency signal has a first sample and hold circuitry for measuring the magnitude of the forward radio frequency signal; wherein the means for measuring the magnitude of the backward radio frequency signal has a second sample and hold circuitry for measuring the magnitude of the backward radio frequency signal; and wherein means for simultaneously triggering the first and the second sample and hold circuitries are provided.

5. The error detection circuitry according to claim 1 further comprising means for generating a trigger signal on the basis of the occurrence of a TDMA signal on the transmission path, thereby providing an internal synchronization.

6. An error detection circuitry according to claim 1 wherein means for generating a trigger signal are coupled to a logic unit, the logic unit comprising an analog to digital control input for switching an internal synchronization on and off.

7. An error detection circuitry according to claim 1 wherein means for generating a trigger signal are coupled to a logic unit, the logic unit comprising a voice/GPRS input for disabling and enabling a sampling function.

8. An error detection circuitry according to claim 1 wherein means for generating a trigger signal are coupled to a logic unit, the logic unit comprising an analogue/digital control output for controlling an analogue/digital conversion of a measured radio frequency signal.

9. An error detection circuitry for detecting an error on a transmission path between a radio system and a transmitter, the circuitry comprising:
   means for measuring the magnitude of a forward radio frequency signal directed from the radio system to the transmitter;
   means for measuring the magnitude of a backward radio frequency signal directed from the transmitter to the radio system;
   means for comparing the magnitudes of the forward radio frequency signal and the backward radio frequency signal; and
   means for generating a trigger signal having: a voltage divider generating a voltage drop signal on the basis of the occurrence of a TDMA signal on the transmission path; means for demodulating, smoothing and buffering the voltage drop signal; an amplifier for amplifying the demodulated, smoothed an buffered signal; a trigger circuit for processing the amplified signal; and a delay circuit for delaying the processed signal.

10. A method for detecting an error on a transmission path between a radio system and a transmitter comprising the steps of:
   measuring the magnitude of a forward radio frequency signal directed from the radio system to the transmitter;
   measuring the magnitude of a backward radio frequency signal directed from the transmitter to the radio system; and
   comparing the magnitudes of the forward radio frequency signal and the backward radio frequency signal, wherein in the first measuring step, the magnitude of the forward radio frequency signal is measured by using a directional coupler that provides a forward voltage;
   wherein in the second measuring step, the magnitude of the backward radio frequency signal is measured by using the directional coupler that provides a backward voltage;
   calculating a ratio between the backward voltage and the forward voltage; and
   deciding that an error is present, if the ratio between the backward and the forward voltages exceeds a predetermined value.

11. The method according to claim 10 further comprising the steps of:
   measuring the magnitude of the forward radio frequency signal in a first sample and hold circuitry;
   measuring the magnitude of the backward radio frequency signal in a second sample and hold circuitry; and
   triggering the first and the second sample and hold circuitries simultaneously.

12. The method according to a claim 10 further comprising the steps of generating a trigger signal on the basis of the occurrence of a TDMA signal on the transmission path, and thereby providing an internal synchronization.

13. The method according to claim 10 further comprising the step of switching an internal synchronization on, when the radio system operates in a digital mode; and switching an internal synchronization off, when the radio system operates in an analogue mode.

14. The method according to claim 10 further comprising the steps of disabling and enabling a sampling function depending on the duration of a digital radio transmission frame.

15. The method according to claim 10 further comprising the step of controlling an analogue/digital conversion of a measured radio frequency signal by a logic unit.

16. A method for detecting an error on a transmission path between a radio system and a transmitter comprising the steps of:
   measuring the magnitude of a forward radio frequency signal directed from the radio system to the transmitter:
   measuring the magnitude of a backward radio frequency signal directed from the transmitter to the radio system;
   comparing the magnitudes of the forward radio frequency signal and the backward radio frequency signal;
   generating a trigger signal by generating a voltage drop signal by a voltage divider on the basis of the occurrence of a TDMA signal on the transmission path;
   demodulating, smoothing and buffering the voltage drop signal;
   amplifying the demodulated, smoothed and buffered signal;
   processing the amplified signal in a trigger circuit; and
   delaying the processed signal.

* * * * *